United States Patent Office 3,262,892
Patented July 26, 1966

3,262,892
SUBSTITUTED POLYPHENYLENE ETHERS
Allan S. Hay, Schenectady, N.Y., assignor to General
Electric Company, a corporation of New York
No drawing. Filed Nov. 29, 1961, Ser. No. 155,828
12 Claims. (Cl. 260—2.2)

This invention relates to the production of synthetic polymeric compositions and to their use for the removal of cations from liquid media. The invention is concerned more particularly with compositions of matter comprising methylsubstituted polyphenylene ethers having acidic groups on the methyl substituents and with their use in removing cations from liquid media, especially aqueous media.

Many natural and synthetic compositions have been proposed for removing ions from solutions. Such materials to be useful must possess the following properties: (1) they must contain either a chemical group which will react with the ion or have an activated surface which physically absorbs the ion; (2) they must be capable of regeneration to at least part of the original activity so that they may be reused; (3) they must be insoluble in the liquid media before and after removing ions from the media. Thus, if an acid form were used as the treating agent it would have to be insoluble both in the acid form and in the salt form, since it is in the acid form before it absorbs cations and in the salt form after it absorbs cations.

In my copending application, Serial No. 212,128, filed July 24, 1962, which is a continuation-in-part of my applications Serial No. 69,245, filed November 15, 1960, and Serial No. 744,086, filed June 24, 1958, both of which are now abandoned, I have disclosed and claimed various polyphenylene ethers having the repeating structural unit represented by the formula

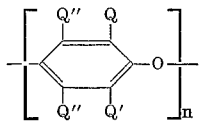

wherein the oxygen atom of one unit is connected to the phenylene nucleus of the adjoining unit, $n$ is a positive integer and is at least 10 and preferably at least 100, Q is a monovalent substituent selected from the group consisting of hydrogen, aliphatic hydrocarbon radicals free of a tertiary α-carbon atom, and aliphatic halohydrocarbon radicals having at least two carbon atoms and being free of a tertiary α-carbon atom, Q' and Q'' are both monovalent substituents which are the same as Q and in addition, halogen, arylhydrocarbon radicals, haloarylhydrocarbon radicals, hydrocarbonoxy radicals free of an aliphatic, tertiary α-carbon atom, and halohydrocarbonoxy radicals having at least two carbon atoms and being free of an aliphatic, tertiary α-carbon atom. The method comprises reacting oxygen in the presence of a tertiary amine and a cuprous salt soluble in the tertiary amine and capable of existing in the cupric state with a phenol having the structural formula

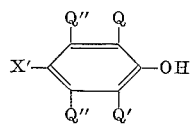

where X' is hydrogen, chlorine, bromine or iodine and Q, Q' and Q'' are the same as defined above. Other specific mixed polyphenylene ethers of this same general type which are useful in the practice of this invention are disclosed and claimed in a copending application of Jack Kwiatek, Serial No. 744,087, filed June 24, 1958, and assigned to the same assignee as the present invention. Because halomethyl groups are so hydrolytically reactive, they produce undesirable products in the above oxidation reaction if they are substituents on the phenol and are, therefore, excluded from the claims of the above-identified copending application.

In my copending application Serial No. 155,827, I have disclosed and claimed halomethyl-substituted polyphenylene ethers and the method of making the same. These compositions have the repeating structural unit represented by the formula

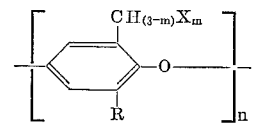

wherein the oxygen atom of one unit is connected to the phenylene nucleus of the adjoining unit, $n$ is a positive integer and is at least 10 and preferably at least 100, $m$ is a number from 0.01 to 3 inclusive, with the proviso that the product obtained by multiplying $m$ by $n$ is at least 1, X is a halogen selected from the group consisting of chlorine and bromine, R is a monovalent substituent selected from the group consisting of hydrogen, halogen, hydrocarbon free of an aliphatic, tertiary α-carbon atom, halohydrocarbon free of an aliphatic, tertiary α-carbon atom, hydrocarbonoxy free of an aliphatic, tertiary α-carbon atom (i.e., —OR' where R' is a monovalent hydrocarbon free of an aliphatic, tertiary α-carbon atom) and halohydrocarbonoxy free of an aliphatic, tertiary α-carbon atom (i.e., —OR' where R' is a monovalent halohydrocarbon free of an aliphatic, tertiary α-carbon atom). Preferably $m$ is 0.1 to 2, and R is hydrogen, methyl, or halomethyl, for example, —CH$_{(3-m)}$X$_m$ where X and $m$ are the same as defined above.

The overall oxidation reaction for preparing the polyphenylene ethers as disclosed and claimed in my copending application, referred to above, is a reaction involving the hydrogen atom of the phenolic group of one phenol molecule, a hydrogen, chlorine, bromine or iodine substituent in the para position of another phenol molecule and oxygen with the formation of water, according to the following schematic diagram:

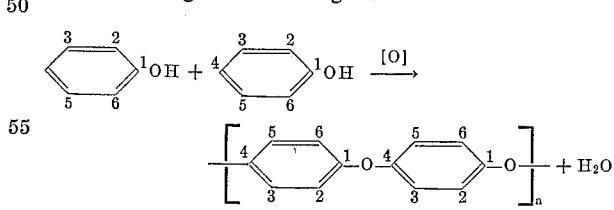

where the numbers indicate the positions of substituents and joining in the names used in this specification, and $n$ is an integer having a value of at least 10.

It is to be understood that the reaction is not a direct oxidation as illustrated but an oxidation involving participation of the copper catalyst system.

The general method of carrying out this oxidation process is to pass an oxygen containing gas through a mixture of one or more monohydric phenols (hereinafter referred to as "phenols") as starting materials, at least one tertiary amine, and at least one cuprous salt.

The phenols which are oxidized by this process to prepare the polyphenylene ethers for use in making the halomethyl compounds of this invention are represented by the following formula:

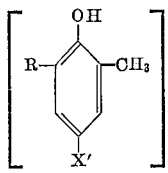

where X′ is a substituent selected from the group consisting of hydrogen, chlorine, bromine and iodine, and R is as defined previously. The polyphenylene ethers so produced may be represented by the formula:

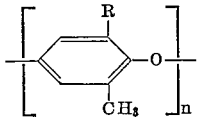

where n and R are as previously defined.

In providing the catalyst comprising a cuprous salt and tertiary amine, the particular cuprous salt used has no effect on the type of product obtained. The only requirement is that the cuprous salt must be capable of existing in the cupric state and must form a complex with the tertiary amine that is soluble in the reaction medium. The necessity for being able to exist in the cupric state is based on my belief that the oxidation of the phenol is accomplished by an intermediate formation of an activated cupric amine complex that reacts with the phenol to regenerate the cuprous amine complex. As far as I can determine, it is impossible to form this activated complex by starting originally with a cupric salt in making the copper amine complex unless reducing conditions are present to form the cuprous salt in situ.

Typical examples of suitable cuprous salts are cuprous chloride, cuprous bromide, cuprous sulfate, cuprous azide, cuprous tetraammine sulfate, cuprous acetate, cuprous propionate, cuprous palmitate, cuprous benzoate, etc. Cuprous chloride, cuprous bromide and cuprous azide produce the highest molecular weight polymers. Although cupric sulfite is not known, cuprous sulfite can be used because it evidently is oxidized to cuprous sulfate. Cuprous salts such as cuprous iodide, cuprous sulfide, cuprous cyanide, cupros thiocyanate, etc., are not suitable since they are either not soluble in tertiary amines or are not capable of existing as stable cupric salts. For example, cupric cyanide and cupric thiocyanate autogenously decompose to the corresponding cuprous salt. Cuprous nitrate and cuprous fluoride are not known to exist but the amine complexes can be made in situ. Substitution of cupric chloride, cupric sulfate, cupric perchlorate and cupric nitrate for the cuprous salt gave no oxidation of monocyclic phenols in the presence of a tertiary amine. Because of its ready availability and low cost, I prefer to use cuprous chloride.

Examples of tertiary amines which may be used to prepare the catalyst are the aliphatic tertiary amines, such as trimethylamine, triethylamine, tripropylamine, tributylamine, trisecondary propylamine, diethylmethylamine, dimethylpropylamine, allyldiethylamine, dimethyl-n-butylamine, diethylisopropylamine, benzyldimethylamine, dioctylbenzylamine, dioctylchlorobenzylamine, dimethylcyclohexylamine, dimethylphenethylamine, benzylmethylethylamine, di(chlorophenethyl)bromobenzylamine, 1-dimethylamino-2-phenylpropane, 1-dimethylamino-4-pentene, etc. When aliphatic tertiary amines are used, I prefer that at least two of the aliphatic groups be straight chain hydrocarbon groups.

In general, tertiary polyamines would behave in the same way as tertiary monoamines except of course, the amount used would only have to be that amount necessary to give the equivalent amount of amino groups.

Typical examples of aliphatic tertiary polyamines are the N,N,N′,N′-tetraalkylethylenediamines, the N,N,N′,N′-tetraalkylpropanediamines, the N,N,N′,N′-tetraalkylbutanediamines, the N,N,N′,N′-tetraalkylpentanediamines, the N,N′,N′,N″,N″-pentaalkyldiethylenetriamines, etc. Likewise, the polyamines may be mixed tertiary aliphatic and tertiary aromatic amines, e.g., piperidinoalkylpyridines, dialkylaminoalkylpyridines, morpholinoalkylpyridines, and so forth. Those tertiary polyamines which have only two or three aliphatic or cycloaliphatic carbon atoms separating the two tertiary amino nitrogens represent a class of polyamines which is superior to the other aliphatic tertiary amines. For example, in the oxidation of monosubstituted phenols and phenol itself, such polyamines give catalysts of enhanced activity and allow the reaction to be run in a shorter time and/or at lower temperature than could be used with the aliphatic tertiary monoamines. However, as in the case of the aliphatic tertiary monoamines, when oxidizing the monosubstituted phenols or phenol itself, the substituents on the amino nitrogen must be large, bulky groups if the high molecular weight polymers are the desired product.

Typical examples of these tertiary polyamines are, for example,

N,N,N′,N′-tetramethylethylenediamine;
N-ethyl-N,N′,N′-trimethylethylenediamine;
N-methyl-N,N′,N′-triethylethylenediamine;
N,N,N′,N′-tetramethyl-1,3-propanediamine;
N,N,N′,N′-tetraethylethylenediamine;
N,N-dimethyl-N′,N′-diethylethylenediamine;
1,2-bis(2-methylpiperidino)ethane;
N,N,N′,N′-tetra-n-hexylethylenediamine;
N,N,N′,N′-tetra-n-amylethylenediamine;
1,2-bispiperidinoethane;
N,N,N′,N′-tetraisobutylethylenediamine;
N,N,N′,N′-tetramethyl-1,3-butanediamine;
1,2-bis(2,6-dimethylpiperidino)ethane;
N,N-didecyl-N′,N′-dimethylethylenediamine;
N-methyl-N′,N′,N″,N″-tetraethyldiethylenetriamine;
N-decyl-N,N′,N′-triethylethylenediamine;
2-(β-piperidinoethyl)pyridine;
2-(β-dimethylaminoethyl)-6-methylpyridine;
2-(β-dimethylaminoethyl)pyridine;
and 2-(β-morpholinoethyl)pyridine; etc.

Examples of cyclic amines are the pyridines, such as pyridine itself, quinuclidine, the dipyridyls, the N-alkyl pyrroles, the N-alkyl pyrrolidines, the N-alkyl piperidines, the N-alkyl diazoles, the N-alkyl triazoles, the diazines, the triazines, the quinolines, the diquinoyls, the isoquinolines, the N-alkyl tetrahydroquinolines, the N-alkyl tetrahydroisoquinolines, the phenanthrolines, the N-alkyl morpholines, etc., including the ring-substituted products of these cyclic amines whereby one or more of the hydrogen atoms on the carbons forming the ring are substituted by groups which may be alkyl (for example, methyl, ethyl, propyl, butyl, amyl, hexyl, heptyl, octyl, etc., and isomers and the homologues thereof), alkoxy (for example, methoxy, ethoxy, propoxy, butoxy, etc., and isomers and homologues thereof), aryl (for example, phenyl, tolyl, dimethylphenyl, chlorophenyl, bromotolyl, naphthyl, chlorobromonaphthyl, etc., and isomers and homologues thereof), aryloxy (for example, phenoxy, toloxy, xyloxy, chlorophenoxy, naphthoxy, etc., and isomers and homologues thereof), and the like. The ring substituents may be the same or different hydrocarbon groups. It is understood that when piperidines, pyrroles, pyrrolidines, diazoles, tetrahydroquinolines, tetrahydroisoquinolines, etc., are used they are tertiary amines whereby an alkyl hydrocarbon radical, such as those listed above for the ring substituents, is also attached to the amine nitrogen group, e.g., N-methyl pyrrole, N-methyl tetrahydroquinoline, N-methyl tetrahydroisoquinoline, N-methyl piperidine, N-methyl pyrrolidine, N-methylimidazole, N-methyl-1,2,-

4-triazole, N-decylpiperidine, N-decyl-pyrrolidine, N-isobutylpiperidine, 1-decyl-2-methylpiperidine, N-isopropylpyrrolidine, N-cyclohexylpiperidine, etc.

Many factors affect the stability of the complex of the tertiary amine and the cuprous salt. These factors are well known in the art and are discussed in detail in such texts as "The Chemistry of the Coordination Compounds" edited by John C. Bailar, Jr., Reinhold Publishing Corp., New York, 1956, see for example pages 174 to 190; and "Mechanisms of Inorganic Reactions," Fred Basolo and Ralph G. Pearson, John Wiley and Sons, Inc., New York, 1958, see for example pages 14–24. As pointed out in the latter text on page 18, one of the major factors influencing stability is the basicity of the ligand. I have found that apparently the ability to form a stable complex as indicated by the basicity of the tertiary amines I use as ligand also is an indication of the activity of the catalyst. Those tertiary amines which are strong bases form more active catalysts than tertiary amines which are weak bases. When the latter are used, typical examples of which are 3,5-diphenylpyridine, phenanthridine, etc., I find that heating of the reaction mixture is desirable to cause the oxidation reaction to proceed rapidly.

The effect of an N-aryl group in tertiary amines, e.g., N,N-dimethylaniline, methyldiphenylamine, etc., is to reduce the basicity of the amine so that its ability to form the copper complex is greatly reduced. Further, the stability of the amine under oxidizing conditions is greatly reduced. Because of these two effects, I prefer not to use tertiary amines having an N-aryl substituent.

The preferred group of phenols for preparing the polyphenylene ether starting materials are o-cresol, the 2-halo-6-methylphenols, e.g., 2-chloro-6-methylphenol, 2-bromo-6-methylphenol, etc., and 2,6-xylenol. However, other phenols having hydrocarbon, halohydrocarbon, hydrocarbonoxy or halohydrocarbonoxy groups in one ortho position and a methyl group in the second ortho position may also be used, including those also having an aryloxy substituent in the para position. Examples of such phenols are: 2-ethyl-6-methylphenol, 2-propyl-6-methylphenol, the 2-butyl-6-methylphenols, the 2-pentyl-6-methylphenols, 2-cyclohexyl-6-methylphenol, 2-phenyl-6-methylphenol, 2-tolyl-6-methylphenol, 2 - benzyl - 6 - methylphenol, 2-methoxy-6-methylphenol, 2-ethoxy - 6 - methylphenol, 2-phenoxy-6-methylphenol, the 2-(chloroethyl)-6-methylphenols, the 2-(chlorophenyl)-6-methylphenols, the 2 - (bromopropoxy) - 6 - methylphenols, the 2 - (iodophenoxy)-6-methylphenols, 2-(difluoroethyl) - 6 - methylphenols, 2,6 - dimethyl - 4 - (2',6' - dimethylphenoxy)phenol, 2,6-dimethyl-4-(2'-methylphenoxy)phenol, etc.

The preference of the oxidation reaction to involve the para position of these phenols is so pronounced that if it is substituted with chlorine, bromine or iodine and the two ortho positions have substituents other than hydrogen, the halogen will be removed from the para position even though the meta positions are unsubstituted. In such case, the halogen atom reacts with and inactivates one molecule of copper catalyst. Therefore, it is necessary to use 1 mole of catalyst for each atom of halogen removed. Since the reaction involving hydrogen atoms in the para position does not destroy the catalyst, only a small catalytic amount needs to be used of the order of 0.1 to 10 mole percent, based on the moles of phenol to be oxidized. Therefore, I prefer to use phenols in my oxidation process which have hydrogen in the para position.

In preparing the catalyst system, mixtures of tertiary amines and mixtures of cuprous salts may be used, but no benefit would accrue from such use over the catalyst prepared by using only a single tertiary amine and a single cuprous salt. Preferably, the cuprous salt is dissolved in the tertiary amine before the phenol reactant is added. In some cases, the dissolving of the cuprous salt may be hastened by heating the mixture, by bubbling in air or oxygen, or a combination thereof. In order to effectively use all of the copper, enough amine should be added to complex and thereby dissolve all of the added cuprous salt. Larger excesses of amine do not adversely affect the reaction, and in some cases may be desirable in order to completely dissolve all the phenol reactant and to act as a solvent for the reaction product. Other solvents such as alcohols, ketones, hydrocarbons, chlorohydrocarbons, nitrohydrocarbons, ethers, esters, amides, mixed ether esters, sulfoxides, etc., may be present in the reaction system, providing they do not interfere or enter into the oxidation reaction. Oxygen or oxygen containing gas is bubbled into the reaction mixture causing an exothermic reaction to take place with the formation of water as a by-product. Since polymeric phenylene ethers are the desired product, it is preferable to prevent the escape of this water of reaction from the reaction vessel when carrying out the reaction by batch process, or to control the escape of water so that there is always one mole of water present for each mole of copper catalyst when carrying out the reaction by batch or continuous process. This can be done by carrying out the reaction under reflux conditions, in a closed reaction system, at superatmospheric pressure, by cooling, in the presence of desiccants, or any combination thereof with controlled removal of water, if desired. Desiccants are especially useful for removing excess water where the water forms faster than it can evaporate and it forms a separate phase with the reaction medium.

The oxygen can be diluted with an inert gas such as nitrogen, helium, argon, etc., or air can be used.

Since the reaction is usually exothermic, the reaction can become overheated, resulting in the formation of undesirable products, since the resins tend to cross-link and form gels. Generally, I initiate the oxidation reaction at as low a temperature as the reaction will start, as evidenced by the reaction becoming exothermic. Usually, I control the oxidation reaction so that the maximum temperature does not exceed 100° C. and preferably does not exceed 80° C. The heat of reaction may be removed, for example, by radiation, convection, or by cooling coils which can either be immersed in, or surround, the reaction vessel.

Ordinarily, the passage of oxygen into the reaction mixture is continued until no more heat is generated, or the desired amount of oxygen is absorbed. Alternatively, I may intermittently or continuously add the same or a different phenol than the starting material during the oxidation reaction to produce a mixed polyarylene ether which has a different structure than if the mixed phenols were used as starting materials. To terminate the reaction, I destroy the catalyst system by addition of an acid preferably a mineral acid, such as hydrochloric acid or sulfuric acid, which reacts with the tertiary amine and cuprous salt, or I remove the product from the presence of the catalyst either by filtering off the product if it has precipitated, or by pouring the reaction mixture into a material which is a solvent for the catalyst system but a non-solvent for the product. Alternatively, I may precipitate the copper as an insoluble compound and filter it from the solution prior to isolating the product or I may add a chelating agent which inactivates the copper. After the product is precipitated, it may be redissolved and reprecipitated any desirable number of times to remove impurities. Further details concerning the preparation of the polyphenylene ethers may be found in the copending Hay and Kwiatek applications, referred to above.

In preparing the halomethyl derivatives of these polyphenylene ethers, the corresponding methyl-substituted polyphenylene ether is dissolved in a suitable solvent, preferably one which will be inert to the halogenating agent, such as a halogenated hydrocarbon, and thereafter reacted with a brominating or chlorinating agent which may be the free elemental halogen, e.g., chlorine or bromine, or a halogenating agent, for example, sulfuryl chloride, sulfuryl bromide, bromosuccinimide, etc. The reaction may be carried out at atmospheric, subatmospheric or superatmospheric pressure, at, below or above ambient temperature. Generally, I prefer to use atmospheric pressure and the temperature from ambient up to that obtained by refluxing the reaction mixture. The halogenation reaction may be hastened by means of exposure of the solution to actinic radiation, e.g., light from an ultraviolet lamp. If a liquid halogenation agent is being used, enough is added to give the desired mono-, di-, or tri-halosubstituted methyl groups on the polymer. If a gaseous halogenation agent is used, enough is passed into the reaction mixture until the amount absorbed is sufficient to give the desired degree of halogenation of the methyl groups. In general, the preponderance of the methyl groups will be monohalogenated before a second halogen is introduced and dihalogenated before a third halogen is introduced into a significant number of the methyl groups.

The halogenated polymer is recovered by pouring the solution into a large volume of a liquid which will precipitate the polymer but will dissolve the balance of the reaction mixture. A convenient solvent for this is methanol. The product may be dissolved and reprecipitated as many times as desired to obtain the desired degree of purification.

The method of preparing these halomethyl-substituted polyphenylene oxides is more fully described and specifically claimed in my copending application Serial No. 155,827, referred to above.

In some instances, I may react the methyl-substituted phenylene ethers directly with agents capable of introducing acidic groups directly into the methyl group, thus avoiding the necessity of converting the methyl substituents on the polyphenylene ethers to halomethyl groups.

By either preparing derivatives of the polyphenylene ethers having acidic groups or derivatives having groups which are precursors of acidic groups which are then converted to acidic groups, I am able to convert the polyphenylene ethers into compounds capable of forming salts with cations and therefore useful as ion exchange resins which can be used for removing cations from liquid media, or as ion exchange resin membranes which are selectively permeable to cations.

The halomethyl groups on the polyphenylene ethers are very reactive and will readily react with alkali metal salts whereby the halogen group is replaced by the anion of the salt. For preparing the cation exchange resins of this invention, the mono(monohalomethyl)- and bis-(monohalomethyl)-substituted polyphenylene ethers can be reacted with many compounds, examples of which are alkali metal cyanides, alkali metal malonic esters, or with alkali metal mercaptans to give compounds which are precursors of acidic groups, for example, the nitrile group, can be hydrolyzed directly to a carboxyl group, the malonic ester substituent can be hydrolyzed to the corresponding malonic acid substituent which readily decarboxylates to give an acidic acid substituent and the mercapto group can be oxidized to a sulfonic acid.

These reactions may be represented by the following equation:

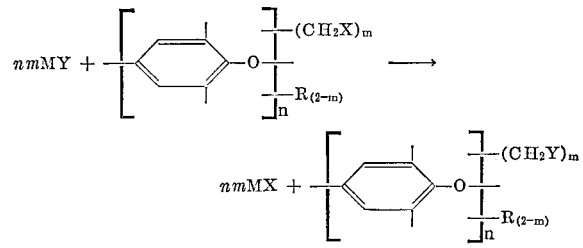

where $m$ is a number from 0.01 to 2 inclusive, $n$ is a positive integer and is at least 10, with the proviso that the product obtained by multiplying $m$ by $n$ is at least 1, M is an alkali metal, examples of which are lithium, sodium, potassium, rubidium, cesium, etc., X is halogen, for example, fluorine, chlorine, bromine, iodine, etc., R is as previously defined and Y is an acidic group or the precursor of an acidic group examples of which are —CN, —SH, —CR″ (COOR′)$_2$, =SO$_3$, —HSO$_3$, etc., where R′ is a monovalent hydrocarbon radical and R″ is the same as R′ and in addition hydrogen.

A phosphonic acid group may be substituted on the methyl group by reaction of a halomethyl group on the polyphenylene ether with a tri(hydrocarbon) phosphite such as triethyl phosphite, followed by hydrolysis.

The sulfonic acid group may be introduced directly on the methyl group of the ethyl-substituted polyphenylene ethers by reaction with a sulfonating agent such as sulfuryl chloride in the presence of a base and actinic irradiation, for example, as supplied by photoflood lights or an ultraviolet lamp.

By acidic group, I mean a substituent having an ionizable hydrogen which will react and be reversibly replaced by a positive ion, e.g., a metallic cation. By a precursor of an acidic group, I mean a substituent that is capable of being chemically converted, e.g., by hydrolysis, metathesis, oxidation, etc., into an acidic group. Although the acidic group or its precursor may be an organic group, e.g., alkyl, including cycloalkyl, aryl, including alkaryl, the halogen substituted derivatives thereof, etc., containing an acidic substituent, e.g., a carboxyl, sulfonic acid, etc., group, such compounds have a decreased ion exchange capacity per unit weight of resin as compared to those in which the acid group is directly on the methyl group of the polyphenylene ether. Therefore, the ion exchange resins in which the acidic group is directly attached to the methyl group are the preferred embodiment of my invention and especially those in which the acidic group is carboxy (—COOH), sulfo (—SO$_3$H) or phosphono (—PO$_3$H$_3$).

From the above discussion it is clear that the substituents having an acidic group can be represented by the formula $$(R')_pZ$$

where $p$ is an integer from 0 to 1, R′ is a divalent substituent selected from the group consisting of alkylene, haloalkylene, arylene and haloarylene, and Z is an acidic substituent selected from the group consisting of carboxy, sulfo and phosphono. When $p$ is 0, Z is attached directly to the methyl group of the polyphenylene ether, i.e., —CH$_2$—Z. When $p$ is 1, one valence of R′ is attached to the methyl group of the polyphenylene ether and the other valence is attached to the acidic substituent, i.e., —CH$_2$—R′—Z. The preferred compounds discussed above are those where $p=0$.

When there are two halogen atoms on the methyl group they may be hydrolyzed to a CHO group which can then be further oxidized to introduce a carboxy group directly on the aryl nucleus. Likewise, when the methyl group contains three halogen atoms it may be hydrolyzed directly to a carboxy group to introduce a carboxy group directly on the aryl nucleus. These and other methods of preparing cation exchange resins having acidic groups directly on the aryl nucleus are disclosed and claimed in the copending applications of W. H. F. Borman Serial No. 155,826, and D. W. Fox and P. Shenian Serial No. 155,825, filed concurrently herewith and assigned to the same assignee as the present invention.

These and other methods of converting halomethyl substituents to acidic groups or to substituents containing acidic groups are well known methods and are described in textbooks on organic chemistry, for example, Synthetic Organic Chemistry, by R. B. Wagner and Harry D. Zook, John Wiley & Sons, Inc., New York, 1953, pages 411–478 and 811–820, and the references cited therein.

Other means of preparing acidic groups are by converting the halomethyl groups to organometallic halide derivatives by reaction with metals such as magnesium and lithium to produce Grignard reagents which can then be converted to acidic groups by reaction with carbon dioxide to produce carboxylic acids or with sulfur dioxide to produce sulfinic acids which can be further oxidized to sulfonic acids with mild oxidizing agents. The Grignard reagent may be converted to a hydrocarbon derivative which is then sulfonated or otherwise converted to an acidic derivative. Other means of converting the halomethyl substituents to acidic derivatives will be readily apparent to those skilled in the art, e.g., by Friedel-Crafts, Wurtz-Fittig, etc., reactions, to introduce hydrocarbon on the methyl group followed by introduction of an acidic group, etc.

From the above discussion it is apparent that the resinous compositions of this invention which have cation exchange properties have repeating units which may be represented by the formula:

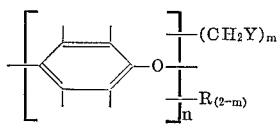

wherein the oxygen of one unit is attached directly to the para position of the phenylene nucleus of the adjacent unit, $n$ is a positive integer and is at least 10 and preferably 100, $m$ is a number from 0.01 to 2 inclusive, with the proviso that the product obtained by multiplying $m$ by $n$ is at least 1, Y is an acidic substituent having an ionizable hydrogen, R is a monovalent substituent selected from the group consisting of hydrogen, halogen, hydrocarbon free of an aliphatic, tertiary α-carbon atom, halohydrocarbon free of an aliphatic, tertiary α-carbon atom and —OR′ where R′ is a monovalent substituent selected from the group consisting of hydrocarbon free of an aliphatic, tertiary α-carbon atom and halohydrocarbon free of an aliphatic, tertiary α-carbon atom.

When a liquid medium having various cation impurities dissolved therein is brought in contact with the compositions of my invention, the cations, e.g., sodium ions, calcium ions, lead ions, magnesium ions, iron ions, silver ions, potassium ions, etc., react with the acidic group to replace the ionizable hydrogen and form salts as part of the resin molecule. The cations are, therefore, effectively removed from solution.

After the resin has sorbed the cations it can readily be regenerated, for example, by washing with a dilute acid, preferably a mineral acid which forms soluble salts with the sorbed cations.

Depending on the number of acidic groups per polymer repeating unit and the liquid medium, the resins range from soluble to insoluble materials. Solutions of the ion exchange resins may be used to prepare solid film membranes useful in non-solvent liquids or the solutions may be used to produce static-free or semiconductive surfaces on objects or as an immiscible phase in removing ions from the other phase in which the polymer is essentially not soluble or at least only slightly soluble.

In order that those skilled in the art may better understand my invention, the following examples are given which are illustrative of the practice of my invention and are not intended for purposes of limitation. In the examples, all parts are by weight unless stated otherwise.

*Example 1*

This example illustrates the preparation of poly(2,6-dimethyl-1,4-phenylene ether). Oxygen was continuously bubbled through a vigorously stirred solution of 900 ml. of nitrobenzene, 150 ml. of pyridine, 6 grams of cuprous chloride and 1 gram of picric acid during the entire reaction period. When all of the copper salt had dissolved, 50 grams of 2,6-dimethylphenol were added. During 15 minutes the temperature of the reaction mixture rose from 30° to 40° C., after which the temperature declined so that at the end of an additional 15 minutes the temperature was 36° C., and the solution was very viscous. The reaction mixture was diluted with an equivalent volume of toluene, followed by the addition of methanol which caused the polymer to precipitate. The polymer was separated by filtration, dissolved in chloroform, filtered and reprecipitated with methanol containing a small amount of hydrochloric acid to remove traces of the amine. The polymer was filtered from the solution and dried in vacuo at 130° C. The yield was 40 grams (81% of theory) of poly(2,6-dimethyl-1,4-phenylene ether) having an intrinsic viscosity of 1.09.

*Example 2*

This example illustrates the preparation of poly(2-methyl-1,4-phenylene ether). Oxygen was continuously passed through a vigorously stirred solution of 135 ml. of s-tetrachloroethane, 1 gram of cuprous chloride, 3 grams of 2-n-amylpyridine and 4.2 grams of anhydrous magnesium sulfate during the entire reaction period. When the cuprous salt had dissolved, 7.5 grams of o-cresol were added. During a reaction time of 50 minutes, the temperature rose from 30° C. to a maximum of 47° C. The reaction was continued for an additional 50 minutes, after which time the polymer was precipitated by pouring the reaction mixture into methanol containing sufficient hydrochloric acid to react with the amine. The solid was separated by filtration and dissolved in chloroform. The solution was filtered and the polymer reprecipitated by pouring into methanol. After drying there was obtained 6.4 grams (86% of theory) of poly(2-methyl-1,4-phenylene ether) having an intrinsic viscosity of 0.21.

*Example 3*

This example illustrates the preparation of poly[2,6-di-(bromomethyl)-1,4-phenylene ether]. Bromine was gradually added to a solution of poly(2,6-dimethylphenylene ether) in refluxing sym-tetrachloroethane in the proportions of slightly more than 2 moles of bromine per mole of ether and reacted until the color of the bromine disappeared (ca. 70 minutes), care being taken to prevent loss of bromine from the reaction vessel. The brominated polymer was isolated by pouring the reaction mixture into methanol and filtering it from solution. The product may be purified by redissolving in chloroform, filtering and reprecipitating by pouring into methanol. On analysis, the product was found to contain 57.6% bromine which corresponds to 2.0 bromine atoms per polymer unit, or 1 bromine atom on each of the two methyl groups. It was previously demonstrated that bromination of this polymer introduces bromine into the methyl groups rather than to the aryl nucleus since essentially all of the bromine can be removed by reaction with lithium aluminum hydride. The removal of bromine by this reagent is specific to benzylic halides and is incapable of removing halogen from the aryl nucleus. Chlorine can be substituted for the bromine to produce the corresponding poly-[2,6-di-(chloromethyl)-1,4-phenylene ether].

*Example 4*

A solution of 20 grams of the brominated polymer of Example 3 in 1000 ml. of tetrahydrofurane was heated to reflux. A solution of 40 grams of potassium cyanide in 50 ml. of water and 0.1 gram of iodine was added to the refluxing solution. The reaction was continued at reflux for 8 hours with continuous stirring. After cooling the solution was filtered from the solid potassium bromide which had precipitated and the solution added to a volume of methanol equal to twice the volume of the solution. The suspension which formed was broken by the addition of aqueous hydrochloric acid. The precipitated polymer was filtered off, washed several times with methanol and acetone and dried for 16 hours at 80° C. The yield was 10.7 grams of polymer containing 28.1% bromine. Assuming that the difference between the starting and terminating bromine analysis represents the amount of bromine converted to nitrile groups, the polymer now contains 0.74 bromine units and 1.26 nitrile groups per unit. This assumption is confirmed by the following results wherein the cyano groups were hydrolyzed to carboxy groups. A suspension of 4.9 grams of the nitrile derivative prepared above was suspended in 160 ml. of isopropanol. A solution of 10 grams of sodium hydroxide and 20 ml. of water and 50 ml. of 30% aqueous hydrogen peroxide was added with continuous stirring and the reaction mixture heated at reflux for 2 hours. After cooling, the solids were filtered from the reaction mixture and washed with dilute aqueous hydrochloric acid in water. The damp solids were suspended in 38% aqueous hydrochloric acid and the solution cooled with ice. A solution of 10 grams of sodium nitrite in 20 ml. of water was added cautiously. The resulting suspension was left standing at room temperature for ½ hour and then heated at reflux for an additional 1 hour. The solid material was filtered off and thoroughly washed with water and methanol.

The fact that this resin has ability to absorb cations from aqueous solution is demonstrated by the following. A portion of the above product was contacted with 50 ml. of 0.1165 N aqueous sodium hydroxide solution which converted the carboxy groups to the corresponding sodium salt. After removing the aqueous solution from the solid, it was found that the excess base in the filtrate when titrated, using methyl red as indicator, required 2.05 ml. of a 1.025 normal aqueous hydrochloric acid solution. The polymer was then regenerated by washing with dilute hydrochloric acid and distilled water and dried 63 hours at 80° C. The sample of the regenerated resin weighs 0.68 gram. This material therefore had an ion exchange capacity of 5.4 milliequivalents per gram (meq./gr.), showing that the resin is represented by the following structural formula

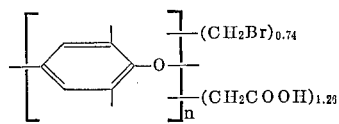

whose theoretical ion exchange capacity is also 5.4 meq./gr., where $n$ represents the number of repeating units in the polymer molecule.

*Example 5*

A 10 gram portion of the polymer prepared in Example 3 was suspended in 100 ml. of triethylphosphite and heated at a temperature of 120° C. for 2 hours with constant stirring. During this time, the polymer went into solution. After cooling the solution to 80° C., 50 ml. of a 38% aqueous hydrochloric acid solution was carefully added and heating continued at 90° C. for 1½ hours. An additional 25 ml. portion of 38% aqueous hydrochloric acid was added and heating continued for an additional ½ hour period. The reaction mixture was diluted with 500 ml. of methanol and then the polymer precipitated by addition of 100 ml. of water. The precipitate was redissolved in methanol which was acidified by addition of aqueous hydrochloric acid, the solution filtered and the polymer again precipitated by pouring the solution into water. The polymer was removed by filtration and dried in vacuo. Elementary analysis of the polymer showed that it contained 13.3% bromine and 16.7% phosphorus. The polymer has an ion exchange capacity of 5.2 meq./gr. for dissociation of the first hydrogen of the phosphonic acid group as shown by potentiometric titration. The analysis corresponds to a polymer containing 0.46 bromine per unit and 1.48/PO₃H₂ groups per unit and would have a theoretical ion exchange capacity of 5.39 meq./gr. for dissociation of the first hydrogen. This ion exchange resin polymer therefore has the repeating structural unit corresponding to the following formula

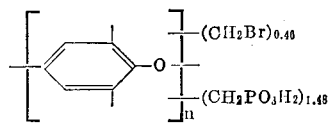

where again $n$ represents the number of repeating units in the polymer molecule and the numbers indicate the average number of groups per unit, the likely polymer being made up essentially of 47.5% of units containing 1 bromine and 1 —PO₃H₂ substituents on the methyl groups and essentially 52.5% of the units containing a —PO₃H₂ substituent on each of the two methyl groups. Polymers in which essentially all of the bromine has been replaced by —PO₃H₂ groups can be prepared by longer reaction of the bromopolymer with the triethylphosphite.

*Example 6*

A solution containing 6 grams of a polymer similar to that prepared in Example 1 and 5 drops from a medicine dropper of pyridine in 200 ml. of benzene was stirred until the polymer was dissolved. The solution was heated to reflux and then while it was exposed to the rays from two 375 watt photoflood lights placed 4 inches from the reaction vessel, a solution of 3.5 grams of sulfuryl chloride dissolved in benzene was added dropwise to the reaction over a period of 0.75 hour. The heat from the lamps was sufficient to keep the reaction mixture at reflux. The reaction was continued for 1 hour by this means. The analysis of the reaction product showed that it contained sulfonic acid groups. Sulfonic acid groups may also be introduced on the methyl groups of poly(2,6-dimethylphenylene ether) by first preparing a corresponding halomethyl-substituted polyphenylene ether, such as the brominated polymer of Example 3, which is then reacted with a reagent which replaces some or all of the halogen groups with a sulfonic acid precursor. For example, sodium bisulfite will replace the halogen group with a —SO₃Na group which may be then treated with an acid to produce the sulfonic acid group (—SO₃H). Likewise, a halogen group may be reacted with thiourea to introduce the

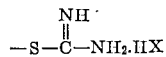

group which can then be oxidized with chlorine or bromine to produce the corresponding sulfonyl halide which is then hydrolyzed to the sulfonic acid group.

For maximum ion exchange capacity, I desire to introduce one acidic group on each methyl group of each aryl nucleus of the polymer molecule (i.e., $m$ is one in the formula of the compositions of this invention). However, solubility of the polymer in water is related to the number of acidic groups per aryl nucleus. Therefore, in many applications where insolubility in water is desired, there may be as little as one acidic group on one out of every 100 aryl nuclei (i.e., $m$ is 0.01) and yet still be a satisfactory cation exchange resin. Preferably $m$ is in the range of 0.1 to 2.

I may also produce cross-links in my cation exchange polymers to decrease solubility of the polymer in aqueous and other solvents, for example, by reacting some of the halomethyl groups, usually a minor percentage, with compounds containing two or more groups in the molecule which are reactive with the halomethyl groups, e.g., the alkali metal salt of a dimercaptan or the alkali metal alkoxide of a glycol, etc.

In preparing my resins, I may include an inert material such as diatomaceous earth (e.g., fuller's earth, including spent fuller's earth, from petroleum refining processes), Alundum, coke, silica, cinders, porous glass, etc., as a carrier for the polymer to increase the effective surface of the latter. This may be done by adding such carriers to a solution of either the starting polymer, the halogenated polymer or the polymer after producing the ion exchange resin. Other fillers, dyes, pigments, and so forth, may likewise be added if desired.

The compositions of this invention may be fabricated into sheets, films, or may be prepared as granulated polymers and may be used in all of those applications where ion exchange resins are useful; for example, they may be used for water treating, as the solid electrolyte in fuel cells, for removal of ions from solution, in electrodialysis for the purification of liquids or solutions, etc.

Obviously, other modifications and variations of the present invention are possible in light of the above teachings. It is therefore to be understood that changes may be made in the particular embodiments of the invention described which are within the full intended scope of the invention as defined by the appended claims.

What I claim as new and desire to secure by Letters Patent of the United States is:

1. A composition comprising a polyphenylene ether having the structural formula

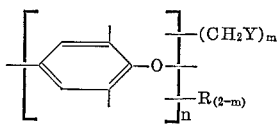

wherein $n$ is a positive integer and is at least 10, $m$ is a number from 0.01 to 2 inclusive, with the proviso that the product obtained by multiplying $m$ by $n$ is at least 1, Y is an acidic substituent having an ionizable hydrogen having the formula

where $p$ is an integer from 0 to 1, R' is a divalent substituent selected from the group consisting of alkylene, haloalkylene, arylene and haloarylene, and Z is an acidic substituent selected from the group consisting of carboxy, sulfo and phosphono and R is a monovalent substituent selected from the group consisting of hydrogen, halogen, hydrocarbon free of an aliphatic, tertiary α-carbon atom, halohydrocarbon free of an aliphatic, tertiary α-carbon atom and —OR' where R' is a monovalent substituent selected from the group consisting of hydrocarbon free of an aliphatic, tertiary α-carbon atom and halohydrocarbon free of an aliphatic, tertiary α-carbon atom.

2. The compositions of claim 1, wherein $p$ is 0.
3. The compositions of claim 1 wherein Y is a carboxy radical and R is halomethyl.
4. The compositions of claim 1 wherein Y is the carboxy radical and R is methyl.
5. The compositions of claim 1 wherein Y is the phosphono radical and R is halomethyl.
6. The compositions of claim 1 wherein Y is the phosphono radical and R is methyl.
7. The compositions of claim 1 wherein Y is the sulfo radical and R is halomethyl.
8. The compositions of claim 1 wherein Y is the sulfo radical and R is methyl.
9. An ion exchange resin comprising the polyphenylene ether of claim 1.
10. An ion exchange resin comprising the polyphenylene ether of claim 2.
11. An ion exchange resin comprising the polyphenylene ether of claim 4.
12. An ion exchange resin comprising the polyphenylene ether of claim 8.

References Cited by the Examiner
UNITED STATES PATENTS
| | | | |
|---|---|---|---|
| 2,366,007 | 12/1944 | D'Alelio | 260—2.2 |
| 3,134,753 | 5/1964 | Kwiatek | 260—47 |

FOREIGN PATENTS
| | | |
|---|---|---|
| 3,137,576 | 6/1964 | Germany. |

OTHER REFERENCES
Haynes, Chemical Society Journal, pp. 2823–2831 (1956), Call No. QD 1, 66 (p. 2825 relied on).

Staffin, Polyphenylene Oxide Polymers; Rubber World, Vol. 139 (1958), p. 408.

ASTIA, Report AD 253989, pages 5–11 and 13 relied on, September 1961.

WILLIAM H. SHORT, *Primary Examiner.*

NORMAN G. TORCHIN, *Examiner.*

J. T. MARTIN, *Assistant Examiner.*